United States Patent [19]

Bane

[11] Patent Number: 4,757,599
[45] Date of Patent: Jul. 19, 1988

[54] PALLET DISMANTLER

[76] Inventor: Marvin L. Bane, 4161 Keever Ave., Long Beach, Calif. 90807

[21] Appl. No.: 899,418

[22] Filed: Aug. 22, 1986

[51] Int. Cl.$^4$ .................... B23P 19/04; B27M 3/00
[52] U.S. Cl. .................... 29/564.3; 29/239; 29/252; 83/401; 83/431; 83/444; 269/112
[58] Field of Search .................... 83/401, 437, 477.1, 83/431, 444; 269/112; 29/239, 252, 564.3, 253

[56] References Cited

U.S. PATENT DOCUMENTS

| | | | |
|---|---|---|---|
| 372,537 | 11/1887 | Hoyt | 269/112 |
| 604,160 | 5/1898 | Reissmann | 269/112 |
| 2,593,843 | 4/1952 | Cannon | 83/401 X |
| 3,869,780 | 3/1975 | Ginnow et al. | 83/477 |
| 4,152,819 | 5/1979 | Conkle | 29/252 |
| 4,320,570 | 3/1982 | Williams | 29/239 X |
| 4,586,235 | 5/1986 | Benvenuto | 29/564.3 |

Primary Examiner—Donald R. Schran
Attorney, Agent, or Firm—Ronald L. Juniper

[57] ABSTRACT

A machine which separates pallet boards from their connecting stringers by sawing essentially through their attaching nails only, thus minimizing damage to the boards so that they can be reused.

In order to separate and loosen the boards so that only the nails are cut a pressing device is designed to squeeze the sides of a pallet inserted within it. Then the loosened pallet, with the boards lifted so that there is space enough for a saw blade to be inserted to cut the nails only, is sent through the previously described sawing machine.

5 Claims, 2 Drawing Sheets

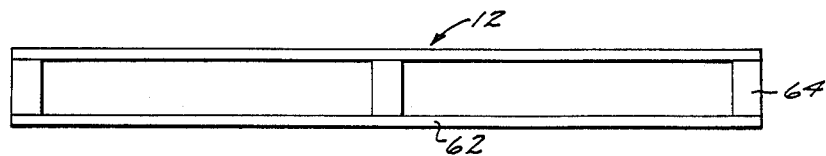
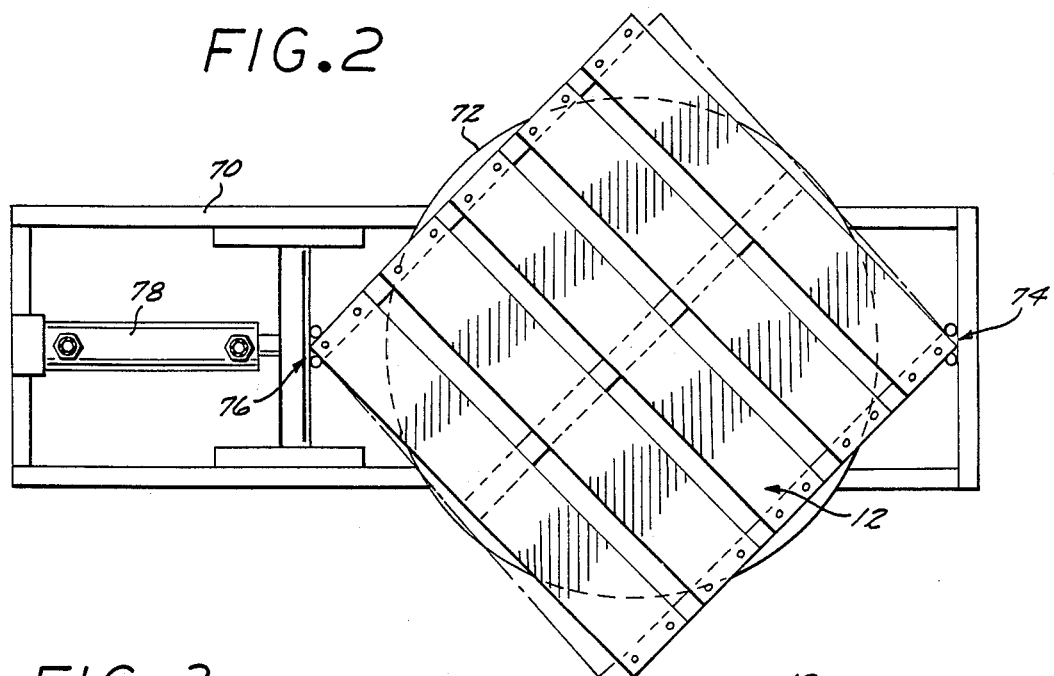
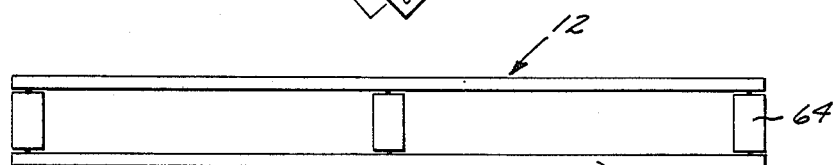
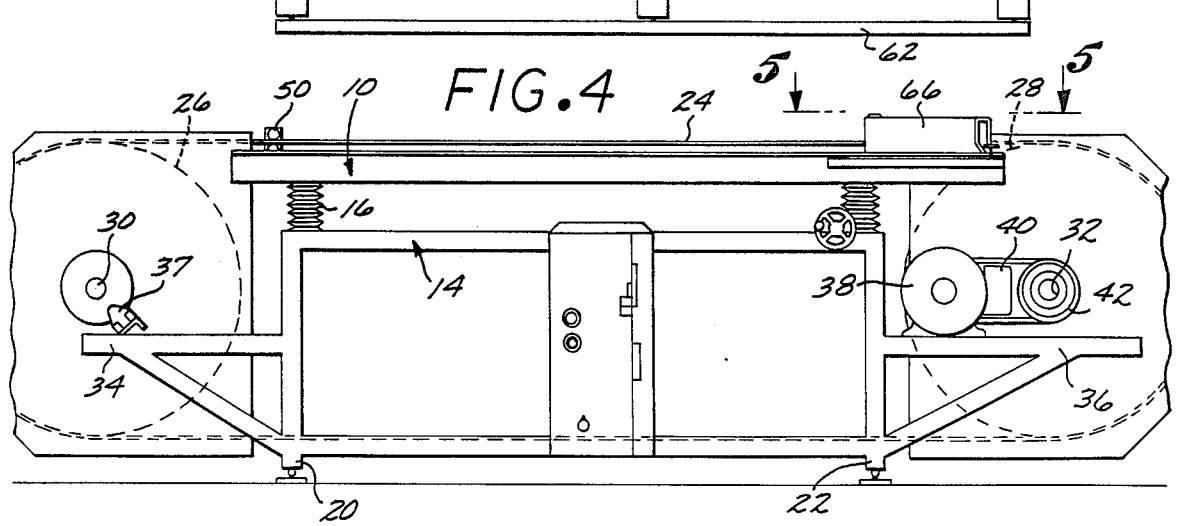
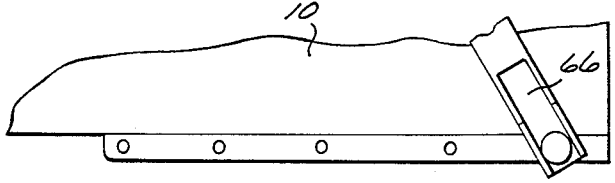

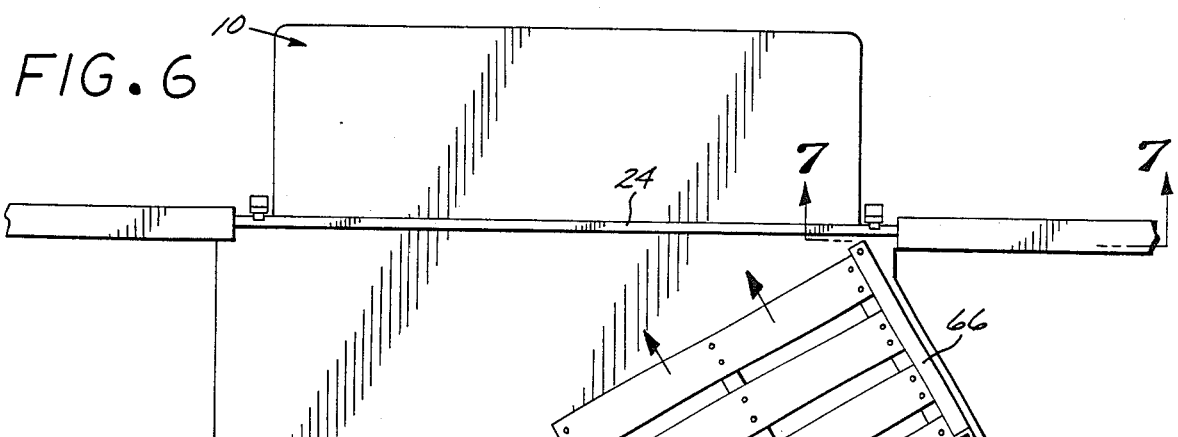
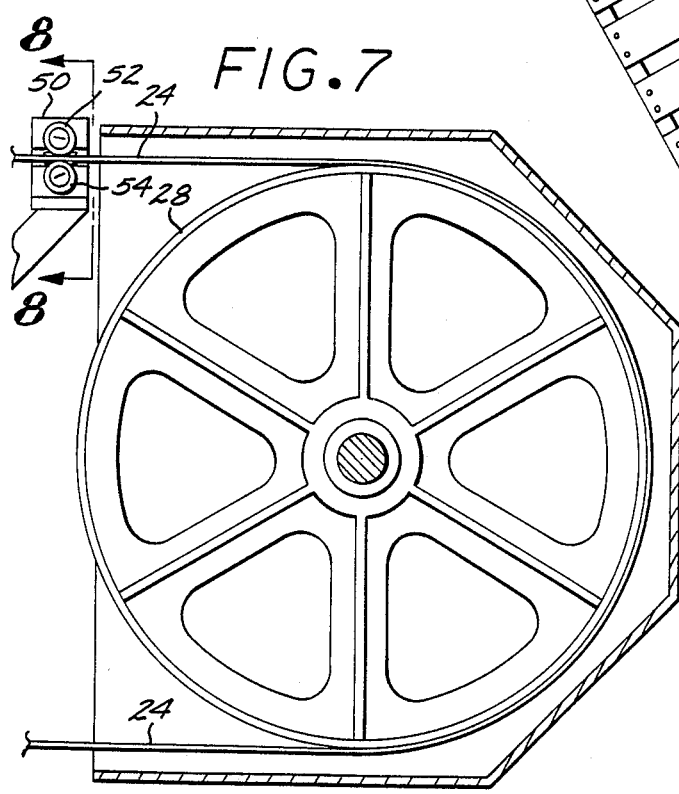
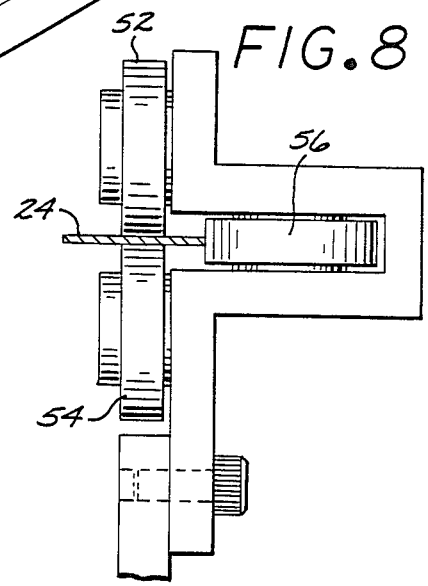
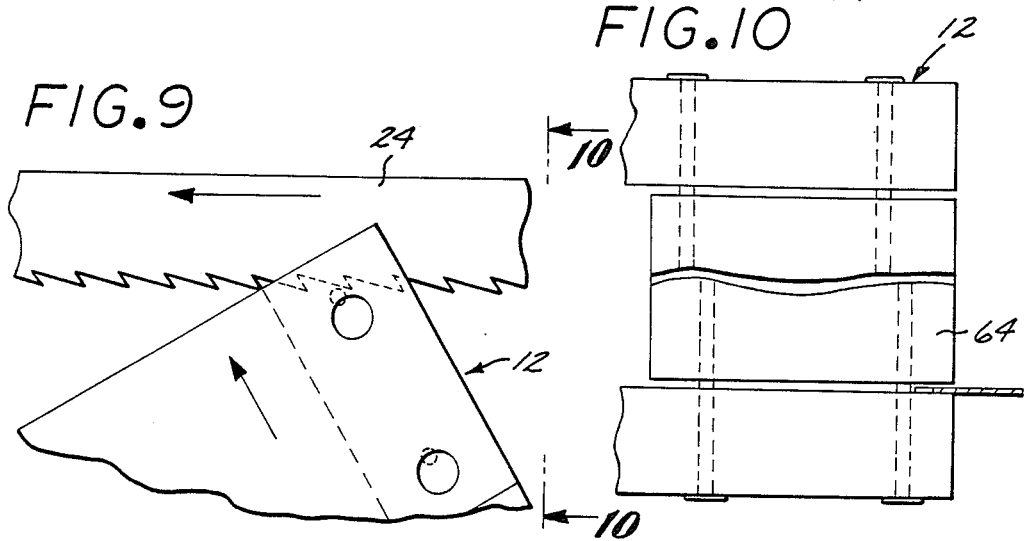

PALLET DISMANTLER

BACKGROUND OF THE INVENTION

Prior to this invention it was questionable whether it was economically feasible to dismantle pallets in order to reuse the boards because of excessive time, expense and damage to the boards.

It is the purpose of this invention to eliminate these problems with a machine that removes all top or bottom boards, separators or caps with one pass-through of the blade, can remove outside stringers only, if desired, and center deck boards. It can dismantle all "block" pallets and remove any blocks for replacement.

After de-nailing, nails do not protrude from boards, split or break and they are the same as before de-nailing. Also, it can remove cement, tar etc. from boards or plywood.

In order to facilitate such dismantling a pallet "thumper" quickly prepares pallets for the de-nailer by squeezing them so as to loosen boards thereby allowing the sawing blade easy access between deck boards and the stringers.

SUMMARY OF THE INVENTION

The machine which is the subject of this invention includes a band saw supported for operation over a working table. The upper portion of this saw is positioned over the working table so that when a pallet is placed on the table and pushed against the cutting edge of the blade the outside stringers, on one side, are separated from the pallet.

This is accomplished by the blade of the band saw cutting essentially through the connecting nails only. In order to do this effectively another part of this invention includes a board-loosening machine in which, prior to cutting, the pallet is placed and squeezed by hydraulic presses on its edges so positioned, during operation, that the boards are loosened. Thus, a space is created between the boards within which a saw blade can be inserted so as to cut only the nails while separating the boards.

BRIEF DESCRIPTION OF THE DRAWINGS

FIG. 1 is a side elevational view of a pallet which is the type that can be dismantled by this invention.

FIG. 2 is a top plan view of the operative portion of a "thumper" device with a pallet held therein being squeezed by a hydraulic ram press so as to cause the top and bottom pallet boards to lift and separate from the stringers.

FIG. 3 is a side elevational view of a pallet after it has been squeezed by the thumper device of FIG. 2. As shown, a space, sufficiently wide enough to insert a saw blade against the engaging nails, has been created between the top and bottom boards and the stringers of the pallet.

FIG. 4 is a partially fragmented (partly sectioned in ghost) side elevational view of a pallet sawing machine, showing a frame supporting, in turn, roller mounts carrying wheels upon which a band saw is supported. This saw is positioned so that its upper section is spaced parallel to and slightly above a table upon which a pallet is to be supported when the pallet is separated by cutting the nails engaging the pallet boards.

FIG. 5 is a fragmented top plan view taken through 5—5 of FIG. 4 showing a guiding arm disposed near one edge of the pallet supporting table.

FIG. 6 is a top plan view (partly fragmented) of the sawing machine showing a pallet being guided toward the saw.

FIG. 7 is a partly fragmented sectional view of the sawing machine as in FIG. 6 showing a wheel which carries one end of the band saw with guides and supporting frame.

FIG. 8 is a fragmented side elevational view taken through 7—7 of FIG. 7 showing the blade guide rollers.

FIG. 9 is a fragmented top elevational view of the saw blade and a pallet as the nails of the pallet are about to be cut by the blade teeth (in ghost).

FIG. 10 is a fragmented side elevational view taken through 9—9 of FIG. 9.

DETAILED SPECIFICATION OF A PREFERRED FORM OF THE INVENTION

The sawing machine de-nailer portion of this invention, as shown in FIGS. 4 and 6 includes a flat table 10 upon which a pallet 12, which is to be separated into its component boards, is placed. The table 10 is supported by a frame 14 having connecting adjustable upper neck supports 16 and 18, with legs 20 and 22, extending to the ground.

A band saw blade 24 is positioned to have a flattened portion thereof extend parallel with and spaced slightly above the plane of the table 10. The band saw blade 24 is carried for movement on wheels 26 and 28 positioned below and on opposite sides of table 10, the shafts of which are axially mounted for rotation. Bearings 30 and 32 are, in turn, supported in pillow blocks mounted on wings 34 and 36, respectively, which extend out from opposite sides of frame 14. As shown, bearing 30 is has an extended disc portion which serves as a braking surface when movably adjacent brake 37 is engaged thereon.

As shown in FIG. 4 wheel 28 is driven by a motor 38 mounted on wing 36 and connected by means of pulley 40 to an enlarged axial portion 42 of wheel 28. Mounted on each edge of the table 10 adjacent to the wheels 26 and 28, and positioned to receive blade 24 therein, are a pair of blade guides 50, which include side rollers 52 and 54 bearing on the opposite sides of blade 24 and rear roller 56 bearing against the back side of blade 24.

The blade guides 50 are so positioned that the saw blade 24, when held therein, will cut into the nails 60 which hold a pallet 12 between its bottom board 62 and connecting stringers 64. That is, to do this the distance that the saw blade 24 is spaced above the flat table 10 is essentially just slightly more than the height of the pallet's bottom board 62.

In order to guide a pallet into the saw at a predetermined angle an adjustable guide arm 66 is pivotally mounted on one edge of table 10. As best shown in FIG. 7, when a pallet 12 is to be dismantled it is placed on table 10 with one side pressed against guide arm 66 and slid at an angle toward saw blade 24.

An example of a motor which can be used with this invention is a ten horsepower fan-cooled 240-480 voltage type which can be converted to single phase 240 volt outlets with an optional "phase-a-matic" converter.

In order to prepare a pallet for dismantling by loosening and lifting the boards so as to readily saw through its connecting nails, a pallet "cruncher", as shown in FIG. 2 has been developed. This is a device which is provided with a frame 70 upon which is supported (and is preferably rotatably mounted) a round flat top "lazy susan" type receiving table 72. Pallets can be "thumped" at the rate of a minimum of two per minute with this easy turning "lazy susan" table. The name often referred to herein for this device is "thumper" due to its relatively high speed operation.

A pallet 12 is placed diagonally on top of table 72 so that a pair of its opposite corners are lodged into matingly spaced corner brackets 74 and 76 carried by frame 70 on opposite sides and slightly above table 72. At least one of the brackets is connected to pressing means for controlled movement toward the opposite bracket. Thus, as shown, bracket 76 is connected to a hydraulic ram 78 which can squeeze pallet 12 held between it and bracket 74 so that it is loosened and changes shape as shown in ghost in FIG. 2.

It is powered by pressing means which moves fast enough to cause a rapid "thumping", not just gradual squeezing, which would tend to minimize advantages of this invention.

After loosening, the boards are separated sufficiently that a space large enough for a saw blade to cut nails 60, only, has been created between top and bottom boards and the connecting stringers.

As best shown in FIG. 9 the saw blade is run backward from its normal direction so that when touching the nails it generates sufficient frictional heat that the nails are virtually melted thusly providing a very smooth surface nearly flush with the surface of the board from which they are cut.

An example of a suitable hydraulic ram 78 uses a twelve inch cylinder powered by a ten-ton hydraulic pump which is actuated by remote control. Another ram or other pressing means (not shown) can be connected to the opposite corner bracket 74 (if made movable) so that it, too, can provide an additional pallet squeezing means.

As part of a pallet dismantling system the thumper can be fed pallets by suitably positioned conveyors (not shown) and then fed directly to the de-nailer by other conveyors.

Though a particular form of this device has shown and described in detail this is not meant as a limitation on this invention, but rather as exemplicative of it, the full range of which is intended to be comprehended and extend to all forms and variations within the spirit of the claims.

What is claimed is:

1. A pallet board loosening device which includes: a table upon which a pallet is to be placed; a pair only of pallet engaging means disposed on opposite sides of said table, spaced and adapted to hold the opposite corners of a pallet placed therein on top of said table, wherein at least one of said engaging means is movable toward said other engaging means; and pressing means connected with at least one movable pallet engaging means adapted to push it toward said other engaging means so as to squeeze a pallet held between said engaging means to cause board lifting.

2. A pallet board loosening device as defined in claim 1 wherein said pressing means is a high-powered quickly actuated hydraulic ram.

3. A pallet board loosening device as defined in claim 1 wherein said table is rotatable and pressing means twists pallets.

4. A pallet board loosening device as defined in claim 1 wherein said pressing means includes another similar pressing means connected to the other engaging means so that each of said engaging means can be pushed toward each other to cause pallet-twisting and board-lifting.

5. A pallet board loosening and cutting machine which includes:
   a rotatable table upon which a pallet of the type having
   a base frame with top and bottom stringers nailed thereto is to be placed:
   one pair only of pallet engaging means disposed on opposite sides of said table, spaced and adapted to hold the opposite corners diagonally, of a pallet placed therein on top of said table, wherein at least one of said engaging means is movable toward said other diagonally positioned, across an engaged pallet, opposite engaging means;
   high-powered quickly-actuated hydraulic ram pressing means connected with at least one of said movable pallet engaging means adapted to quickly push it toward said other engaging means so as to squeeze a pallet held therein diagonally thereby causing twisting of its alignment such an amount that stringers thereon are lifted from the base frame enough to expose the nails sufficiently that a band saw blade can be inserted between the stringers and base frame of a pallet;
   in combination with a denailer type cutting machine which includes a flat, not-recessed, cutting surface for receiving pallets; band saw cutting means wherein the teeth thereof are angled uniformly the same direction, interrupted and pointed and said band saw is positioned parallel to and above said cutting surface at the height of the bottom board of a pallet so as to be able to cut into the nails securing the stringers of a pallet to the base thereof; and
   driving means engaging said band saw which moves it opposite from its normal cutting direction and, instead, in the direction of the angled cutting teeth so that when it bears against the nails of the stringer attaching it to a pallet, it melts said nails to produce a smooth surface when cut.

* * * * *